(12) United States Patent
Wasyluk (10) Patent No.: US 9,920,955 B2
(45) Date of Patent: Mar. 20, 2018

(54) WATER JACKET FOR SOLID PARTICLE SOLAR RECEIVER

(71) Applicant: Babcock & Wilcox Power Generation Group, Inc., Barberton, OH (US)

(72) Inventor: David T Wasyluk, Mogadore, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 390 days.

(21) Appl. No.: 14/712,160

(22) Filed: May 14, 2015

(65) Prior Publication Data

US 2015/0330667 A1 Nov. 19, 2015

Related U.S. Application Data (60) Provisional application No. 62/000,517, filed on May 19, 2014.

(51) Int. Cl.
| | |
|---|---|
| *F24J 2/00* | (2014.01) |
| *F24J 2/02* | (2006.01) |
| *F24J 2/05* | (2006.01) |
| *F24J 2/10* | (2006.01) |
| *F24J 2/07* | (2006.01) |

(Continued)

(52) U.S. Cl.
CPC . *F24J 2/02* (2013.01); *F24J 2/05* (2013.01); *F24J 2/07* (2013.01); *F24J 2/10* (2013.01); *F24J 2/4625* (2013.01); *F24J 2/4649* (2013.01); *F24J 2/18* (2013.01); *F24J 2/20* (2013.01); *F24J 2/4636* (2013.01); *F24J 2002/003* (2013.01); *Y02E 10/41* (2013.01)

(58) Field of Classification Search
CPC ........ F24J 2/07; F24J 2/02; F24J 2/055; F24J 2/4625; F28D 15/043; F28D 15/00; F28D 21/0012; F28D 9/00; F27D 19/00; F27D 15/00; F27D 3/14; F27D 3/16; F27D 3/18; F27D 17/004; F27D 17/008; F27D 2003/164; F27D 2003/168; F27D 2003/169; F27D 2009/0067; F27D 2019/0028; F27D 2019/0075; F27D 2099/00

See application file for complete search history.

(56) References Cited

U.S. PATENT DOCUMENTS

| | | | | |
|---|---|---|---|---|
| 4,512,336 | A * | 4/1985 | Wiener | F22B 1/006 |
| | | | | 122/235.12 |
| 2003/0182861 | A1* | 10/2003 | Weimer | C09C 1/48 |
| | | | | 48/197 R |

(Continued)

*Primary Examiner* — Jason Lau
(74) *Attorney, Agent, or Firm* — Michael J. Seymour (57) ABSTRACT

A solar receiver includes: water jacket panels each having a light-receiving side and a back side with a watertight sealed plenum defined in-between; light apertures passing through the watertight sealed plenums to receive light from the light-receiving sides of the water jacket panels; a heat transfer medium gap defined between the back sides of the water jacket panels and a cylindrical back plate; and light channeling tubes optically coupled with the light apertures and extending into the heat transfer medium gap. In some embodiments ends of the light apertures at the light receiving side of the water jacket panel are welded together to define at least a portion of the light-receiving side. A cylindrical solar receiver may be constructed using a plurality of such water jacket panels arranged with their light-receiving sides facing outward.

15 Claims, 9 Drawing Sheets

(51) Int. Cl.
    *F24J 2/46*     (2006.01)
    *F24J 2/18*     (2006.01)
    *F24J 2/20*     (2006.01)

(56) References Cited

U.S. PATENT DOCUMENTS

2007/0221208 A1*   9/2007   Goldman ............... F03G 6/005
    126/651
2013/0008433 A1*   1/2013   Hahn ..................... F24J 2/265
    126/674

* cited by examiner

WATER JACKET FOR SOLID PARTICLE SOLAR RECEIVER

This application claims the benefit of U.S. Provisional Application No. 62/000,517 filed May 19, 2014. U.S. Provisional Application No. 62/000,517 filed May 19, 2014 is incorporated herein by reference in its entirety.

The United States Government may have certain rights to this invention pursuant to contract number DE-AC36-08G028308 between the United States Department of Energy and Alliance For Sustainable Energy, LLC. This invention was developed under subcontract ZGJ-3-23325-01 between Alliance For Sustainable Energy, LLC. and Babcock & Wilcox Power Generation Group, Inc. under contract number DE-AC36-08G028308.

BACKGROUND

The following pertains to the solar power generation arts and related arts. In a known solar concentration design, a field of heliostats concentrates solar power onto a (typically tower-mounted) solar receiver. A flowing heat transfer medium flows through the solar receiver. This flowing heat transfer medium absorbs energy from the concentrated light and is thus heated. The hot flowing heat transfer medium may be variously used, for example being fed into a fluidized-bed boiler to generate steam for driving an electrical turbine-generator.

Some such solar concentrators are described, by way of non-limiting illustrative example, in Ma, U.S. Pub. No. 2013/0257056 A1 published Oct. 3, 2013 which is incorporated herein by reference in its entirety, and in Ma et al., U.S. Pub. No. 2013/0255667 A1 published Oct. 3, 2013 which is incorporated herein by reference in its entirety, and in Maryamchik et al., "Concentrated Solar Power Solids-Based System", U.S. Ser. No. 14/250,160 filed Apr. 10, 2014 and published as U.S. Pub. No. 2014/0311479 A1 which is incorporated herein by reference in its entirety.

BRIEF SUMMARY

In some aspects disclosed herein, a module for a solar receiver comprises: a water jacket panel having a light receiving side and a back side and a watertight sealed plenum defined between the light-receiving side and the back side; light apertures passing through the watertight sealed plenum of the water jacket panel to receive light from the light-receiving side of the water jacket panel; and light channeling tubes optically coupled with the light apertures and extending away from the back side of the water jacket panel.

In some aspects disclosed herein, a solar receiver comprises: light channeling tubes having apertures at light-receiving ends and extending into a volume through which a heat transfer medium flows; and a jacket containing the apertures and defining a plenum through which a coolant fluid other than the heat transfer medium flows.

In some aspects disclosed herein, a solar receiver comprises: a cylindrical assembly of panels wherein each panel includes light apertures and a watertight plenum arranged to cool the light apertures, the light apertures of each panel arranged to receive light from a light-receiving face of the panel, the light-receiving faces of panels facing outward from the cylindrical assembly of panels; a cylindrical back plate disposed inside the cylindrical assembly of panels with an annular gap defined between the cylindrical assembly of panels and the cylindrical back plate; and light channeling tubes having open first ends connected to the light apertures of the cylindrical assembly of panels and extending into the annular gap defined between the cylindrical assembly of panels and the cylindrical back plate and having closed second ends opposite the open first ends.

These and other non-limiting aspects and/or objects of the disclosure are more particularly described below.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

A value modified by a term or terms, such as "about" and "substantially," may not be limited to the precise value specified.

It should be noted that many of the terms used herein are relative terms. For example, the terms "interior", "exterior", "inward", and "outward" are relative to a center, and should not be construed as requiring a particular orientation or location of the structure.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The term "plane" is used herein to refer generally to a common level, and should be construed as referring to a volume, not as a flat surface.

To the extent that explanations of certain terminology or principles of the solar receiver, boiler and/or steam generator arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, the texts of which are hereby incorporated by reference as though fully set forth herein.

Figure 1:
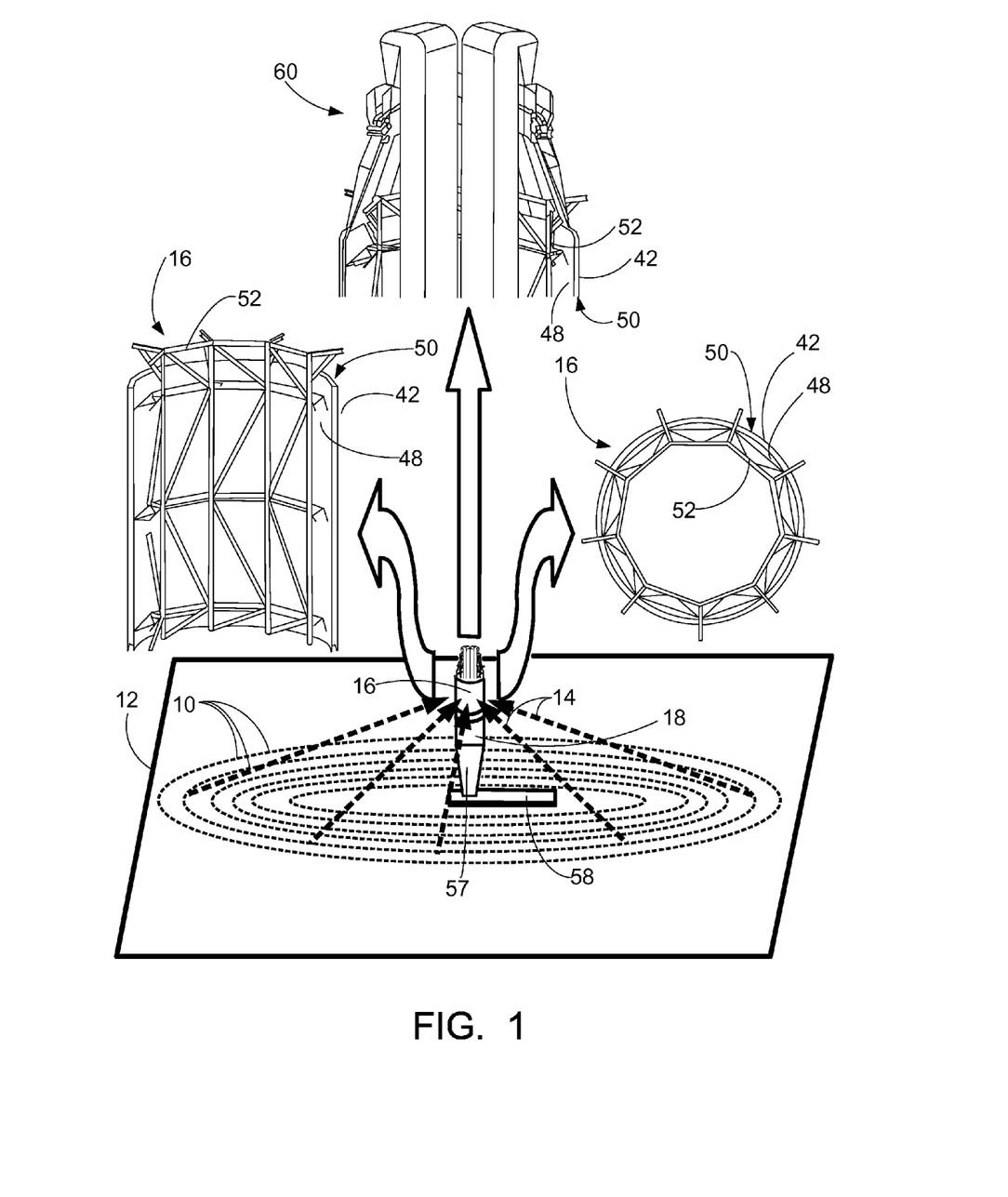
FIG. 1 diagrammatically shows an illustrative solar concentrator system, with enlarged detail drawings of the solar receiver shown in insets identified by block arrows.

With reference to FIG. 1, a solar concentrator power generation plant includes a field of heliostats 10 disposed over an area 12 occupied by the plant. The heliostats 10 are diagrammatically represented in FIG. 1, and typically include suitable components (not shown) such as beam-forming optics typically comprising mirrors or other reflectors and beam-steering apparatus such as multi-axis motorized system that cooperate to capture solar radiation impinging upon the heliostat and form the light into energy beams 14 that are directed to a solar receiver 16, with the multi-axis motorized systems of the heliostats 10 operating to track the (apparent) movement of the sun across the sky to keep the light beams 14 directed to the solar receiver 16 over the course of the day. (As used herein, the terms such as "light", "solar radiation", and "solar energy" are used interchangeably, and encompass all energy from the sun that is captured and concentrated by the heliostats 10 and/or other referenced system components whether such solar energy is in the form of visible light, infrared light, or ultraviolet light. In the case of components that are heated by solar radiation, the term "energy" or "solar energy" encompasses energy in the form of heat so generated.) In the illustrated configuration, the solar receiver 16 is mounted in an elevated position on a tower 18 so as to provide an unimpeded direct line-of-sight between each heliostat 10 in the field and the solar receiver 16. However, other physical arrangements are contemplated—for example, a tower could include a top-mounted mirror system that directs light downward to a solar receiver located at (or even below) ground level (variants not illustrated).

Figure 2:
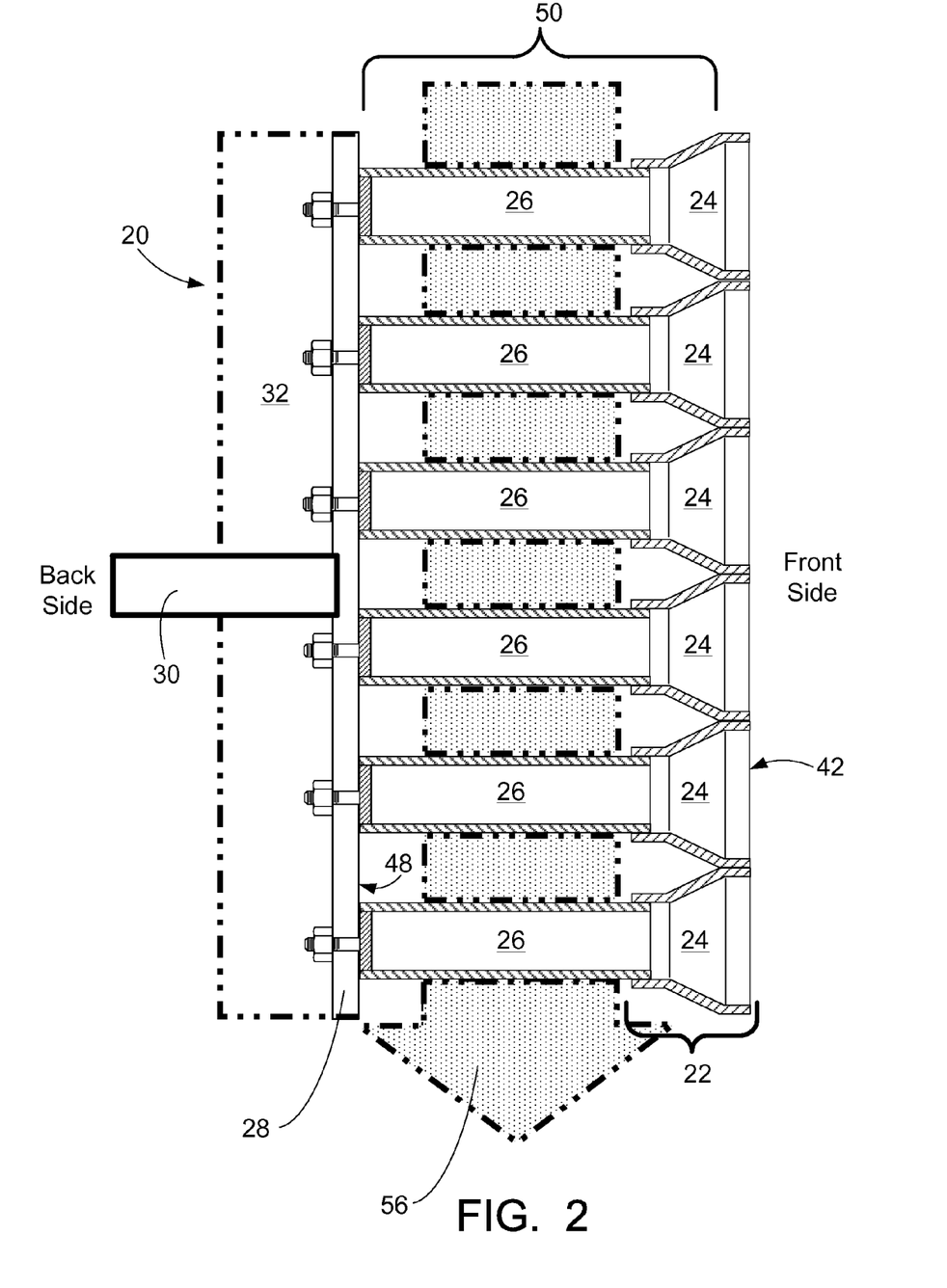
FIG. 2 diagrammatically shows a side view of one solar receiver module of the solar receiver of FIG. 1, with the flow path of the flowing heat transfer medium indicated diagrammatically by a shaded block arrow.

With continuing reference to FIG. 1 including its insets, and with further reference to FIG. 2, the solar receiver 16 comprises an assembly of solar receiver tube modules 20, one of which is shown in side view in FIG. 2, where it is seen that the solar receiver tube module 20 includes a front tube sheet 22 defined by adjoining light apertures 24, light channeling tubes 26 connected with respective apertures 24 and extending into the receiver tube module 20, and a back plate 28 to which "rear" ends of the light channeling tubes 26 are connected. By way of non-limiting illustration, the apertures 24 and light channeling tubes 26 may comprise bent sheet metal (e.g. sheet steel) components, drawn tubes, or so forth, and the back plate 28 may comprise a metal plate (e.g. steel plate). For example, the light channeling tubes can be manufactured by a drawing process or by stamping two halves and welding with two longitudinal seam welds. As used herein, the following orientation terms are used: the "front" side of the solar receiver module 20 is faced by the front tube sheet 22 where light enters, while the "back" side of the solar receiver module 20 is the side faced by the back plate 28. The light channeling tubes 26 are in an approximately horizontal orientation, although some tilting of the light channeling tubes 26 is contemplated, for example a upward tilt of a few degrees up to about 45° is contemplated to better align with the upward angle of light beams 14 coming from the heliostats 10. A module support post 30 (for example, a metal pipe or rod) connects with the back plate 28 and extends rearward. Optionally, insulation and lagging 32 is provided on the back side of the module 20, for example contacting the back plate 28, to reduce heat loss from the back side of the module 20.

With reference back to the insets of FIG. 1, solar receiver modules 20 are assembled to form the solar receiver 16 as a hollow cylindrical structure having an outward-facing cylindrical surface 42 defined by adjoining planar front tube sheets 22 of the adjoining solar receiver modules 20, and an inward-facing cylindrical surface 48 defined by adjoining curved back plates 28 of the adjoining solar receiver modules 20. The two cylindrical surfaces 42, 48 define an annular gap 50, which gap 50 is also indicated for the single solar receiver module 20 depicted in FIG. 2. It will be appreciated from FIG. 2 that the light channeling tubes 26 of the solar receiver modules extend through the annular gap 50 between the two cylindrical surfaces 42, 48, and that the light beams 14 suitably input light into the light channeling tubes 26 through the apertures 24 in the outward-facing cylindrical surface 42. The solar receiver modules 20 are suitably supported by their respective module support posts 30 on a truss or other support structure 52 secured to the tower 18.

With continuing reference to FIGS. 1 and 2, a flowing heat transfer medium 56 (diagrammatically indicated in FIG. 2 by a downward shaded block arrow) flows generally downward through the gap 50 under force of gravity. The flowing heat transfer medium 56 thus flows over the exterior surfaces of the light channeling tubes 26. These tubes 26 are preferably constructed so as to absorb most of the channeled light, for example by including suitable absorbing coatings on their inside surfaces, optional faceting to cause light to scatter within the light channeling tubes 26 so as to increase the number of opportunities for absorption, or so forth. Thus, the solar energy channeled through the light channeling tubes 26 heats the tubes 26 and the heat is then transferred to the flowing heat transfer medium 56. In this manner, solar energy contained in the light beams 14 is converted to heat energy contained in the flowing heat transfer medium 56, and thus the solar energy is contained as heat in the flowing heat transfer medium 56 that exits the bottom of the solar receiver 16.

With particular reference back to FIG. 1, the heated flowing heat transfer medium 56 exiting the bottom of the solar receiver 16 may be variously used. In the illustrative example, the heated flowing heat transfer medium 56 exiting the bottom of the solar receiver 16 feeds into a storage silo 57 and fluidized-bed boiler or heat exchanger 58 shown diagrammatically in FIG. 1. The storage silo 57 provides thermal storage capability, as hot particles are stored in the silo 57 and may for example be used to provide thermal energy during cloudy days or at night. Thermal storage via the silo 57 decouples energy collection and power production thereby allowing dispatchable, continuous power production. The fluidized-bed boiler or heat exchanger 58 may, for example, comprise a bubbling fluidized bed (BFB) or circulating fluidized bed (CFB) boiler or heat exchanger or so forth, in which the heated flowing heat transfer medium 56 is dispersed on the fluidized bed so as to heat water (to form steam) or other working fluids such as air or supercritical $CO_2$ to drive a power cycle and turbine-generator (not shown) to produce electrical power or to perform other useful work.

The flowing heat transfer medium 56 is typically a flowing particulate medium such as silica sand or calcined flint clay (e.g. with average particle size on the order of a few hundred microns), but is not limited thereto (for example, it is contemplated to employ air as the flowing heat transfer medium). In typical embodiments in which the flowing heat transfer medium 56 is a flowing particulate medium, it is to be understood that this flowing particulate medium serves as the hot "fluid" which is dispersed onto the fluidized bed of the fluidized-bed boiler or heat exchanger 58. Said another way, the term "fluid" as used herein in reference to the flowing heat transfer medium 56 encompasses flowing particulate media.

With reference to FIG. 1, after giving up its heat to the heat exchanger, the flowing particulate medium is suitably returned to the top of the solar receiver 16 by any suitable elevator structure, for example driven by motors, diesel engines, or so forth. The top inset of FIG. 1 diagrammatically shows a suitable return structure 60 for this purpose comprising receiver bucket elevators and a solids distribution hopper.

With reference to FIG. 2, the front tube sheet 22 and the back plate 28 define the gap 50 of the solar receiver module 20 through which the flowing heat transfer medium 56 flows over the exterior surfaces of the light channeling tubes 26. Thus, the front tube sheet 22 and the back plate 28 should seal against leakage of the flowing heat transfer medium 56 outside of the module 20. Moreover, the connections of the light channeling tubes 26 to the front tube sheet 22 should also seal against leakage of the flowing heat transfer medium 56 into either the apertures 24 or the light channeling tubes 26, since any such leakage will introduce blockage into the light channeling tubes 26 and/or result in egress of the flowing heat transfer medium 56 outside of the solar receiver module 20. Moreover, it will be appreciated that interfaces between adjoining modules 20 should be similarly sealed. That is, the interfaces between adjoining front tube sheets 22 of outward-facing cylindrical surface 42 and the interfaces between adjoining back plates 28 of the inward-facing cylindrical surface 48 should seal against leakage of the flowing heat transfer medium 56, so as to seal against leakage from the annular gap 50 of the solar receiver 16.

Another consideration is that the solar receiver 16 undergoes substantial thermal cycling during startup, shutdown, cloud transients and emergency trips. In some contemplated embodiments intended to operate a fluidized bed boiler or heat exchanger, the flowing heat transfer medium 56 is to be heated to a temperature of order 800° C. (1470° F.). Accordingly, the solar receiver 16 should be robust against thermal cycling over a range of 0° C.-800° C. in some embodiments, and over even larger temperature ranges in other contemplated embodiments.

Figure 3:
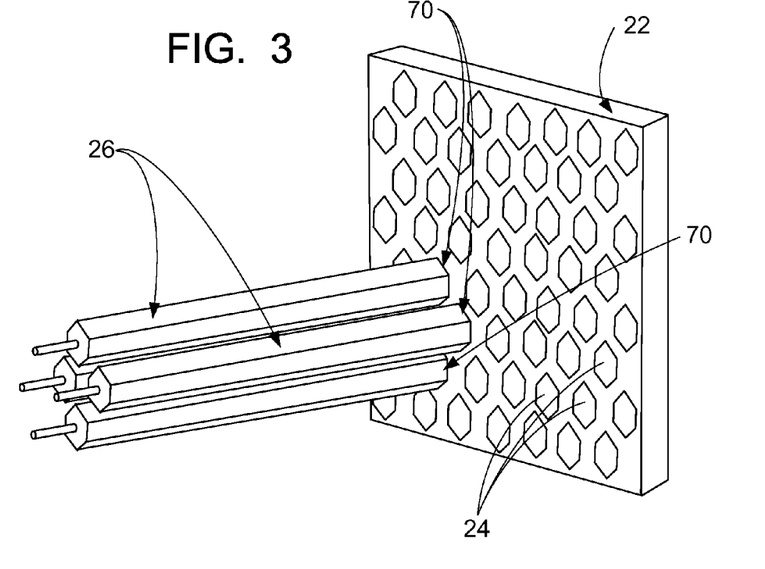
FIGS. 3-6 diagrammatically illustrate aspects of a suitable assembly of a solar receiver module of the solar receiver of FIG. 1.
Figure 4:
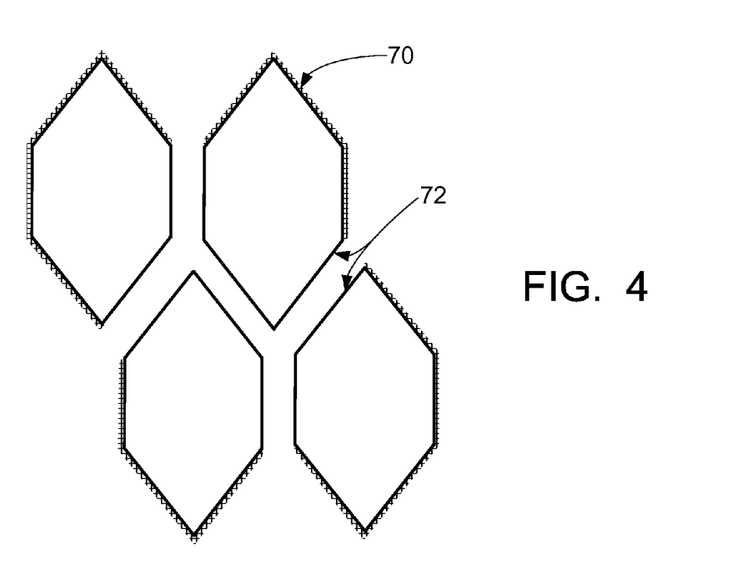
Figure 5:
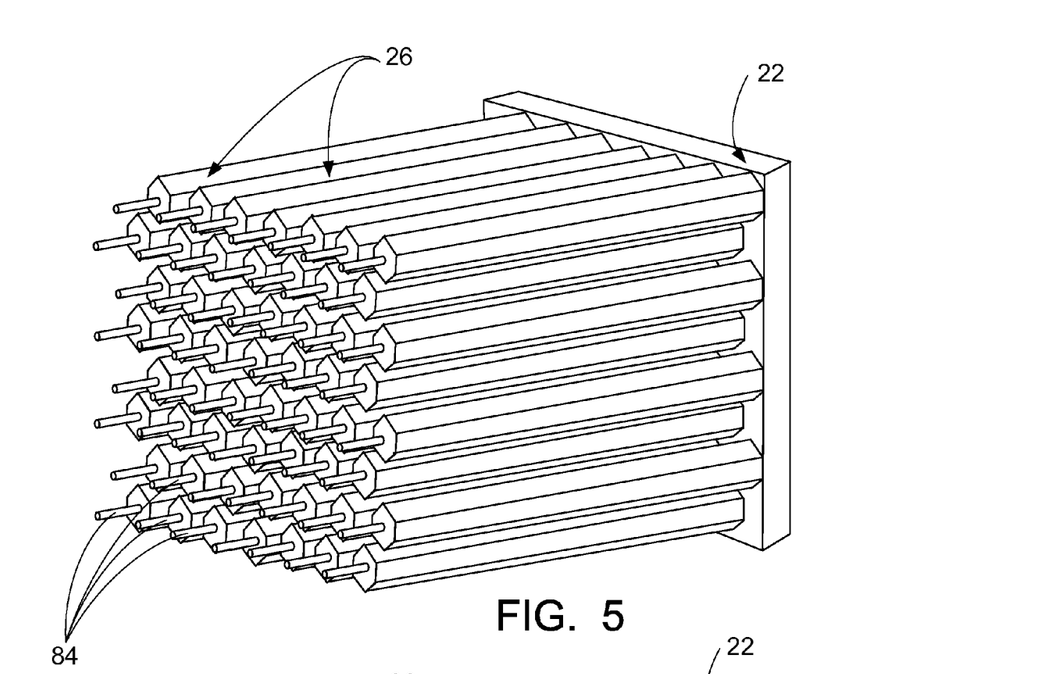
Figure 6:
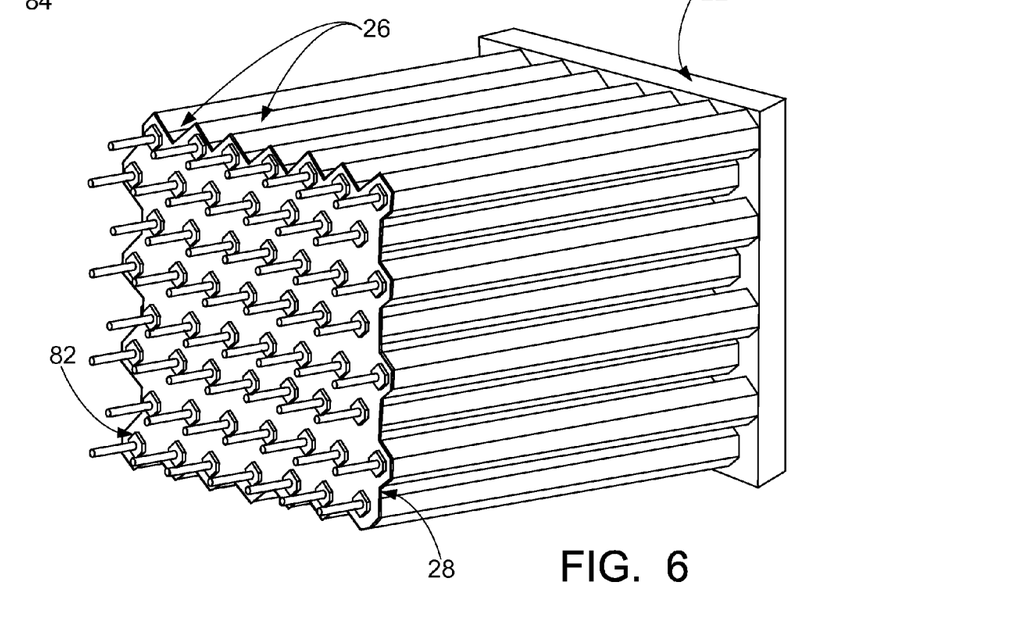
Figure 7:
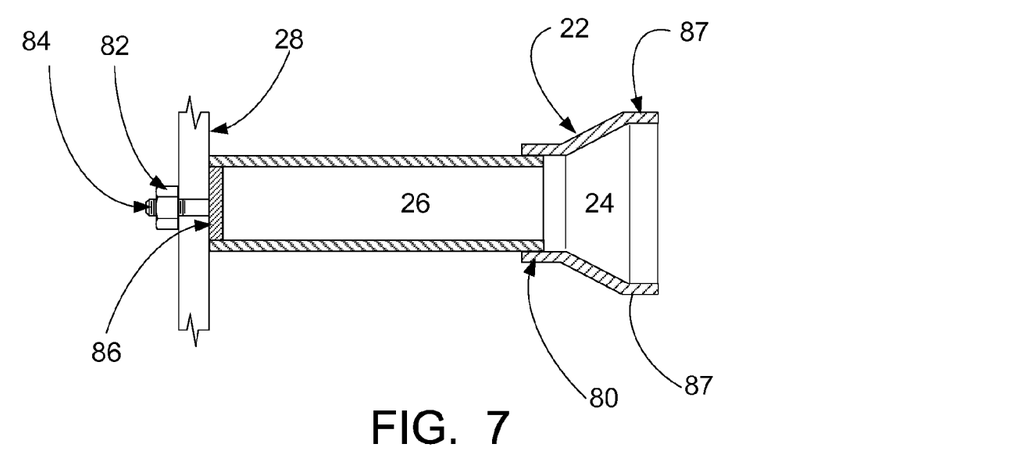
FIG. 7 shows an enlarged view of one light channeling tube of the solar receiver of FIG. 1.
Figure 8:
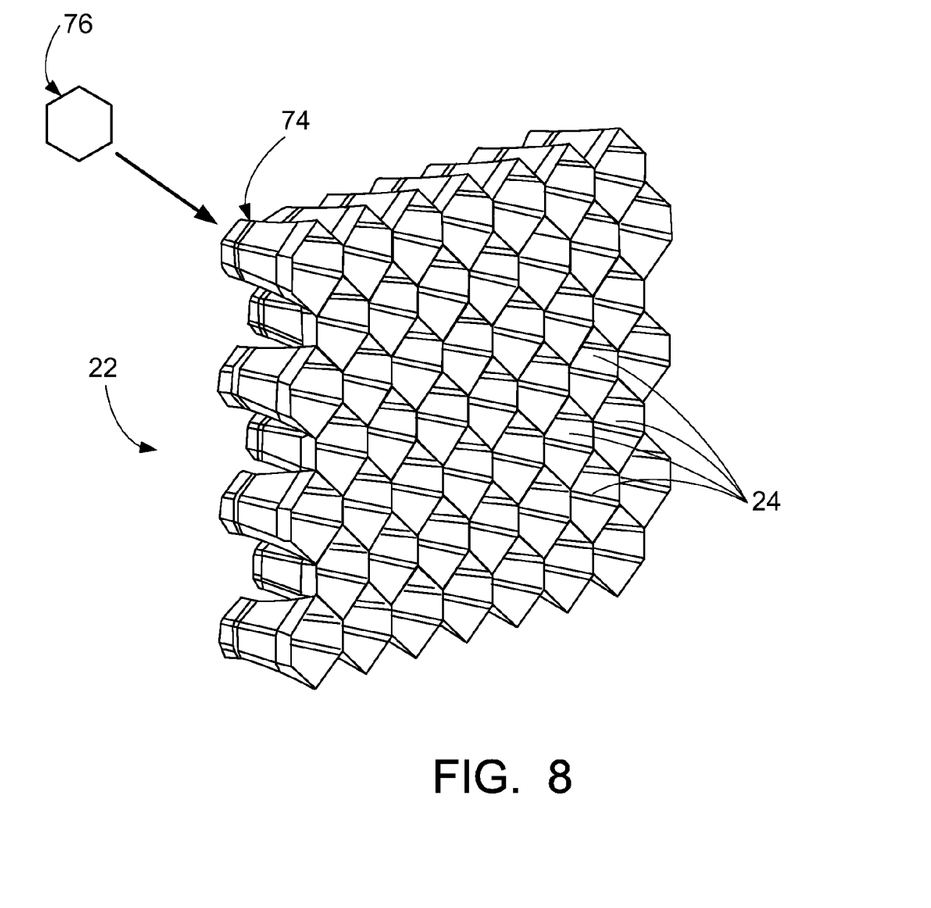
FIG. 8 shows a perspective view of the front tube sheet of the solar receiver of FIG. 1, with the inner perimeter of the necked-down portion of an aperture shown in an inset.

With reference to FIGS. 3-8, a suitable approach for assembling the solar receiver module 20 to address these design factors (provide a low stress thermal expansion) is described. FIGS. 3, 5, and 6 illustrate diagrammatic perspective views of assembly operations. FIG. 4 diagrammatically shows suitable welds used in the operation depicted in FIG. 3. FIG. 7 shows an enlarged a diagrammatic side sectional view of one light channeling tube 26 of the assembled solar receiver module. FIG. 8 shows a diagrammatic perspective view of the front tube sheet 22, with the inner perimeter of the necked-down portion of an aperture shown in an inset.

FIG. 3 shows a diagrammatic perspective view of a first assembly operation in which a small number (illustrative four) light channeling tubes 26 are welded to their respective corresponding apertures 24 of the front tube sheet 22. The welded light channeling tubes 26 are optionally chosen to be centrally and adjacently located so as to minimize differential thermal expansion amongst the welded light channeling tubes 26, although other selections of the light channeling tubes 26 to be welded are also suitable. FIG. 4 illustrates a suitable welding approach for the operation depicted in FIG. 3. In this approach, each tube to be welded is force-fitted onto or into the mating opening of the front tube sheet 22, and fillet welds 70 are formed by a suitable welding process. Some interior surfaces 72 may not be accessible for welding in the case of immediately neighboring welded tubes as shown in FIGS. 3 and 4 (although some of these surfaces could be accessible for welding if welding is performed before inserting adjacent tubes). In an alternative approach, the welded tubes are chosen to be spaced apart in the array, so that symmetrical and/or additional welds can be made on each tube in order to provide additional support/rigidity of the front tube sheet to resist wind loads for example.

FIG. 5 depicts a diagrammatic perspective view of a next operation in which the remaining light channeling tubes 26 are inserted into their corresponding apertures 24, but are not welded. To this end, as seen in FIGS. 7 and 8 the back side of each aperture 24 of the front tube sheet 22 includes a necked-down portion 74 that defines an inside perimeter 76 facing the end of the light channeling tube 26. As seen in FIG. 7, the outer perimeter of the light channeling tube 26 is sized slightly smaller than the matching inside perimeter 76 of a necked-down portion 74 of the aperture 24, and the insertion of the tube end into the necked-down portion 74 of the aperture 24 forms a slip joint 80 (labeled in FIG. 7) between the end of the tube 26 and the aperture 24. Other slip joint configurations are contemplated. For example, the tube can have a larger diameter than the necked-down portion of the aperture, in which case the necked down portion of the aperture fits inside the tube end. It is noted here that the light channeling tubes 26 may have various perimeter shapes, such as triangular, circular, square or diamond, regular or flared hexagonal, or so forth. In the illustrative example of FIGS. 3-8, the light channeling tubes 26 have regular hexagonal perimeters and accordingly the inner perimeter 76 of the necked-down portion 74 of the aperture 24 is correspondingly hexagonal, as seen in the inset of FIG. 8.

In the illustrative example of FIG. 8, the apertures 24 also have hexagonal perimeters at the front side of the front tube sheet 22, with the necking of each aperture 24 leading to the light input (i.e. front) side of the aperture 24 being flared outward or approximately conically expanding. This enhances light collection efficiency by the aperture 24. Additionally, by making the apertures 24 with hexagonal perimeters at the front side of the front tube sheet 22, they can form a honeycomb structure as seen in FIG. 8, which maximizes the collection area of the front tube sheet 22 that collects light into the light channeling tubes 26. Other geometries can be used, such as circular apertures, but such geometries will result in added "dead area" between the circular apertures that does not lead into the light channeling tubes, reducing receiver efficiency.

FIG. 6 depicts a next operation in which the back plate 28 is attached to the back ends of the light channeling tubes 26 by fasteners 82, which may by way of illustrative example be washer/nut fasteners that connect with threaded studs 84 extending from the back ends of the light channeling tubes 26 (see FIG. 5). With particular reference to FIG. 7, in one configuration an end cap 86 including the threaded stub 84 is welded to the back end of the light channeling tubes 26.

In the solar receiver module 20 fabricated in accord with the process described with reference to FIGS. 3-8, each light channeling tube 26 is supported in cantilevered fashion from the back plate 28 by way of the fastener 82, 84. The front end of the light channeling tube 26 is laterally restrained by the slip joint 80, but is free to expand or contract in the axial direction (that is, in the direction of the tube axis). This allows independent thermal expansion to accommodate tubes operating at different temperatures and thus expanding to different lengths. In the case of the welded light channeling tubes 26 (those of FIGS. 3-4), the thermal expansion of the tubes is not accommodated by a slip joint but rather has the effect of moving the front tube sheet 22 outward (during thermal expansion) or inward (during thermal contraction) in response to heating or cooling, respectively, of the solar receiver module 20. The slip joints of the remaining (large majority) of light channeling tubes accommodates any differences in thermal expansion amongst the array of light channeling tubes 26. The front tube sheet 22 is supported by all the light channeling tubes 26, but is secured in the tube-axial direction only by the welded tubes of FIGS. 3-4.

In an alternative embodiment, it is contemplated to employ separate designated tie rods (not shown) welded between the back plate 28 and the front tube sheet 22 to provide the tube-axial directional support, rather than obtaining this axial support by welding designated light channeling tubes 26 as in the operation of FIGS. 3-4. This alternative approach employing tie rods has the advantage of employing the slip joints 74 for all of the light channeling tubes 26 (as none are welded to the front tube sheet 22 in this alternative embodiment), but perhaps at the cost that some light receiving area is lost (i.e. select tubes removed to make room for tie rods) to accommodate the designated tie rods. Additionally, the impact of the tie rods on the flow paths of the flowing heat transfer medium 56 should be taken into account in performing numerical thermal analyses.

With particular reference to FIGS. 7 and 8, the front tube sheet 22 provides the front seal between tubes within a module for the gap 50 (see FIG. 2). To this end, the hexagonal aperture perimeters at the front side of the front tube sheet 22 which form the honeycomb structure seen in FIG. 8 are joined to create the seal. In one contemplated approach, the front tube sheet 22 is formed by punching hexagonal openings corresponding to the apertures 24 into a single metal sheet (e.g. single steel sheet) and then working the openings using sheet metal forming tooling to define the necked-down portion 74.

With reference to FIG. 7, in another contemplated approach, each hexagonal aperture 24 is separately formed from sheet metal, with the six sides of the hexagonal perimeter being flat sides 87. The flat sides 87 of each pair of adjoining apertures are then welded together to assemble the front tube sheet 22. Other approaches are contemplated. For example, in a variant approach the sides are flat on one to four of the segments of the hexagonal perimeter around the perimeter of the module and straight on the remaining segments where two apertures adjoin. In this case, only the edges of each adjoining apertures are welded together to assemble the front tube sheet 22. As yet another variant, it is contemplated to employ separate or integral tube cap pieces that are welded to the back end of the tube or formed as part of the tube to facilitate making good seals.

In solid particle solar receiver designs such as those of FIGS. 1-8, the flared tube openings (apertures) 24 on the exterior face of the solar receiver module 20 where light enters the light channeling tubes 26 suitably employ a reflective coating on the inside surface of the apertures 24 and solid particle flow over the outside to keep them cool. These apertures 24 are exposed to high levels of concentrated solar heat flux from the field of heliostats 10. The particle flow area between adjoining apertures 24 consists of small V-shaped passages due to the flared ends where they are joined together. The ability of the particles to effectively cool the apertures 24 in this area is limited.

In other embodiments, instead of cooling the apertures with solid particles, a more effective method disclosed herein is to cool them with water. Water cooling can reduce operating metal temperatures and increase the design life (typically 30 years) of the receiver. With lower operating metal temperatures, lower grade alloys can also be used for the apertures. These advantages can potentially reduce fabrication and maintenance costs and improve reliability.

Figure 9:
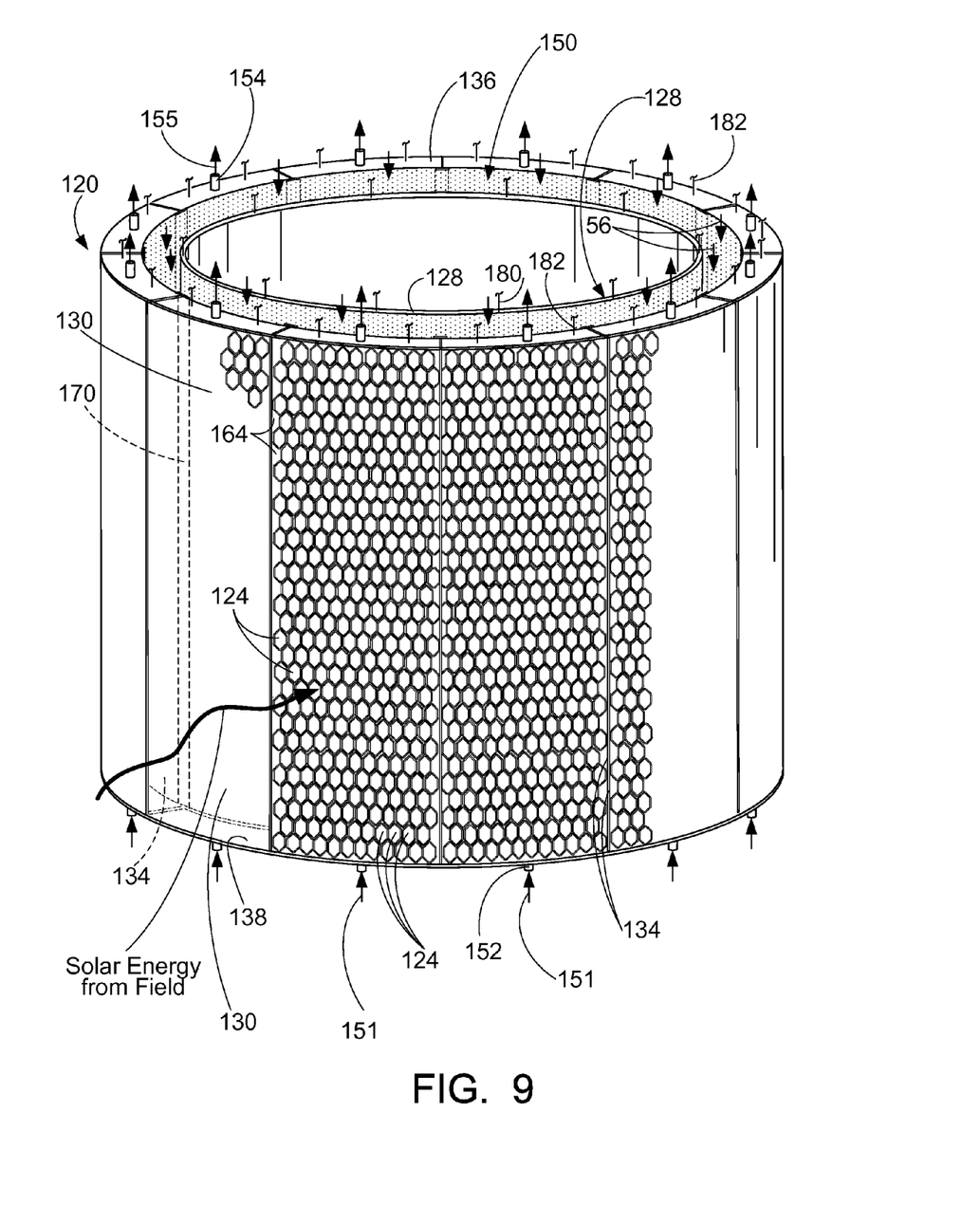
FIG. 9 diagrammatically shows a solar receiver including water jacket panels for cooling light apertures of the solar receiver.
Figure 10:
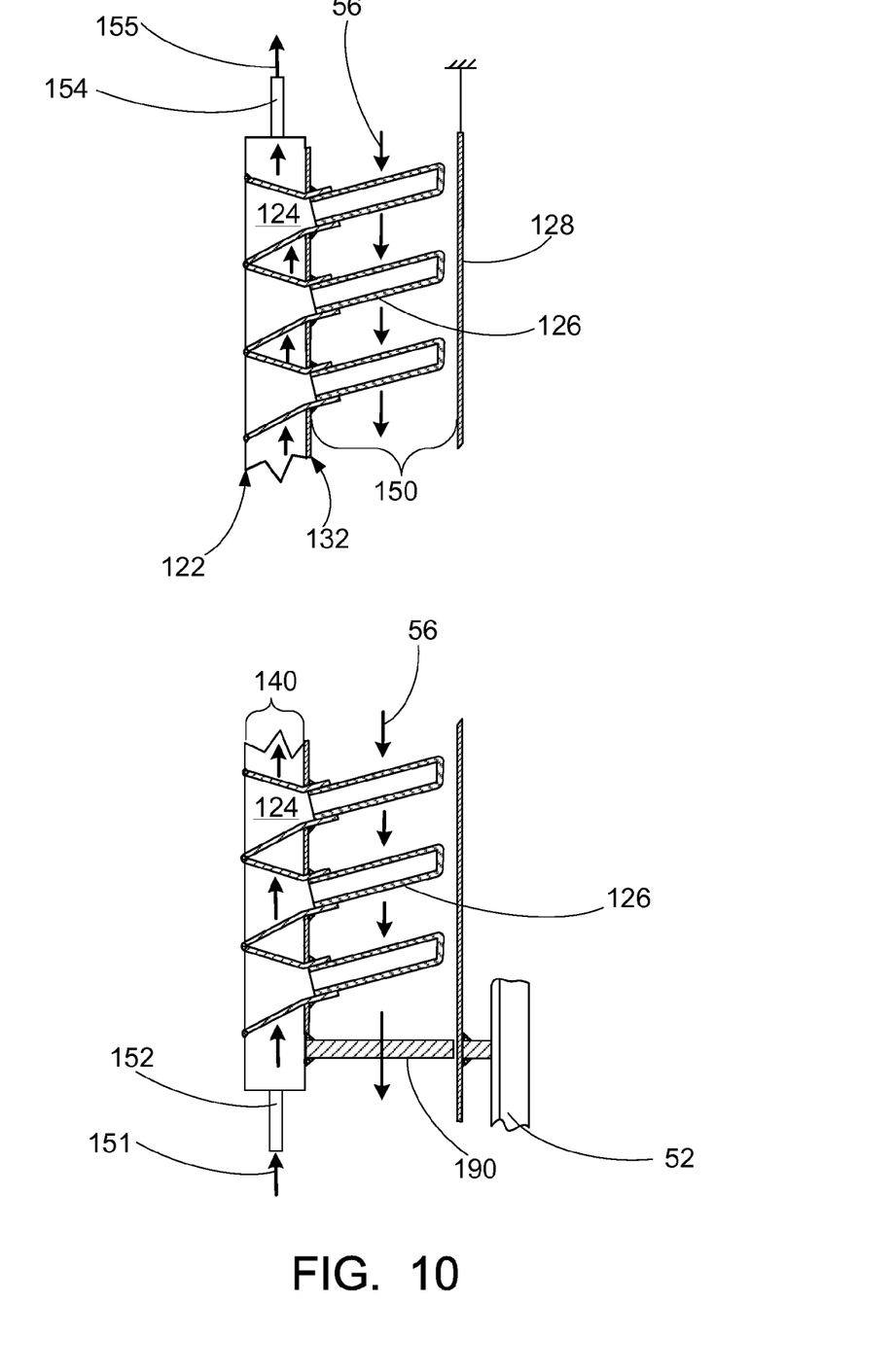
FIG. 10 diagrammatically shows a side sectional view of one solar receiver module of the solar receiver of FIG. 9.

With reference to FIGS. 9 and 10, in this embodiment a solar receiver 120 includes an exterior light-receiving face with apertures 124 connecting with light channeling tubes 126. The inside of the apertures are highly reflective, for example coated with a reflective-specular (preferably not diffuse) coating to maximize the transmission of light into the tubes. The inside of the tubes need to be at least partially optically absorbing to transfer the collected light energy, and for example may be coated with various absorptive coatings to control light spreading along the length of the tube and maximize heat transfer to the particles flowing around the outside of the tubes. More particularly, the exterior light-receiving face of the solar receiver 120 comprises a set of water jacket panels 130 that form the outer circumference of the solar receiver 120. FIG. 9 shows a perspective view of the solar receiver 120 while FIG. 10 shows a side-sectional view. In one contemplated embodiment, each water jacket panel 130 is about 12-feet wide and 60-feet long making them truck-shippable as a stack of such water jacket panels, although other dimensions are contemplated. In this illustrative example, twelve separate water jacket panels 130 would provide for a 46-foot diameter receiver; more generally, other numbers of panels are contemplated. Each water jacket panel 130 includes an exterior light-receiving face 122 which forms a portion of the circumferential exterior light-receiving face of the solar receiver 120. The apertures 124 are welded together at the exterior light-receiving face of the water jacket or, as in the illustrated embodiment of FIGS. 9 and 10, the exterior light-receiving face 122 is defined by mutually welded apertures 124 that thus define the light-receiving face 122. The water jacket panel 130 further includes an interior face 132 parallel to (or alongside) the exterior light-receiving face 122, and connecting walls (e.g. illustrated side plates 134, top plate 136 and a bottom plate 138 that connect the outer perimeters of the exterior light-receiving face 122 and the interior face 132 to define a plenum 140 of the water jacket panel 130. The interior face 132 is located between the exterior light-receiving face 122 and a cylindrical or curved back plate 128 of the solar receiver 120. (The back plate 128 is equivalent to the back plate 28 of the embodiment of FIGS. 2, 6, and 7.) The interior face 132 of the water jacket panel 130 is typically relatively closer to the exterior light-receiving face 122 as compared with the back plate 128 of the solar receiver so as to define the plenum 140 of the water jacket 130 as a relatively thin plenum (or outer annular gap 140 in an assembled cylindrical solar receiver) proximate to (or encompassing) the apertures 124. By comparison, a relatively thicker sealed gap 150 (or inner annular gap in an assembled cylindrical solar receiver 120) is formed between the interior face 132 of the water jacket 130 and the cylindrical or curved back plate 128 through which the heat transfer particles (or more generally, heat transfer medium 56) flow. The gap 150 corresponds to the gap 50 of the solar receiver of the embodiment of FIGS. 1-2, while the flowing heat transfer medium 56 corresponds to the flowing heat transfer medium 56 of the embodiment of FIG. 2. Water 151 is pumped through each of the illustrative twelve water jacket panels 130 in parallel (it is to be understood the number of panels may be other than the illustrative example of twelve panels), entering at the bottom through water inlets 152, flowing through the plenum 140 defined between the exterior light-receiving face 122 and the interior face 132, and exiting at the top through water outlets 154 as steam-free hot water 155 (although designs providing some conversion to steam are also contemplated). Water flow from bottom to top, as illustrated, advantageously applies maximal cooling at the bottom of the solar receiver 120, where the downward flowing heat transfer medium 56 is hottest due to having acquired heat in transit through the solar receiver 120, and less cooling near the top of the solar receiver 120 where the heat transfer medium 56 is cooler. Water flow through the water jacket panels 130 via natural circulation (no pumps) is also contemplated. The heated water 155 is optionally used as preheated feed water in the power generation cycle to increase plant efficiency.

Figure 11A:
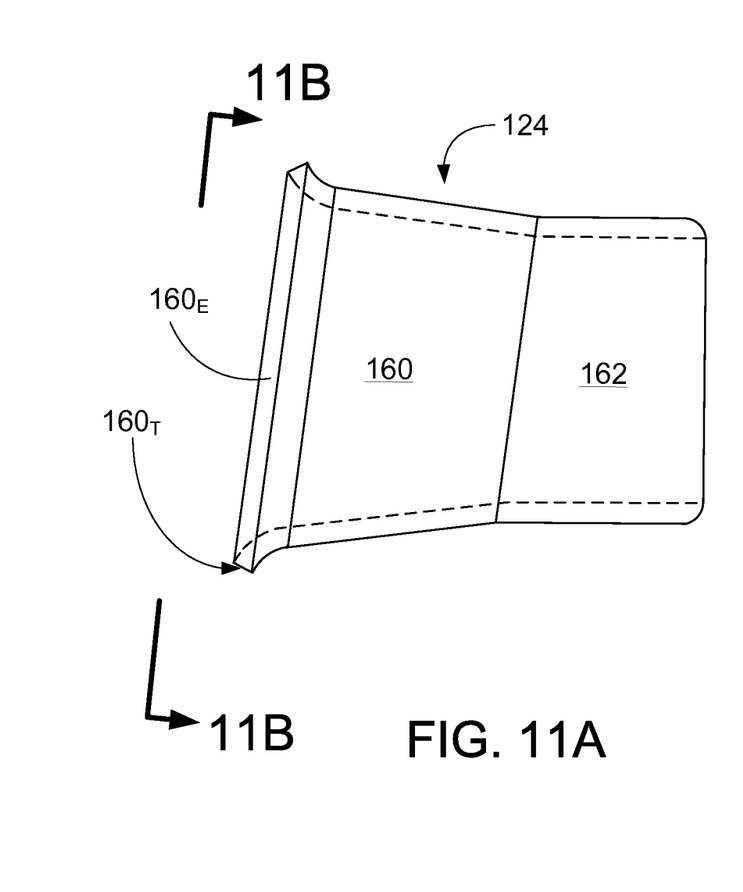
FIG. 11A shows a side view of an embodiment of the light aperture of FIGS. 9 and 10 which includes a flared and straight section.
Figure 11B:
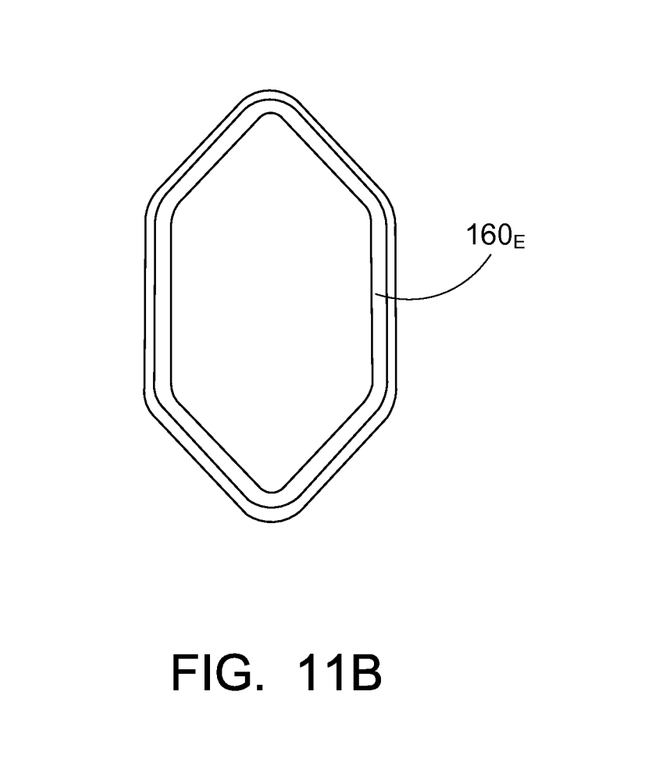
FIG. 11B shows the flared end of the flared light-receiving section.
Figure 12:
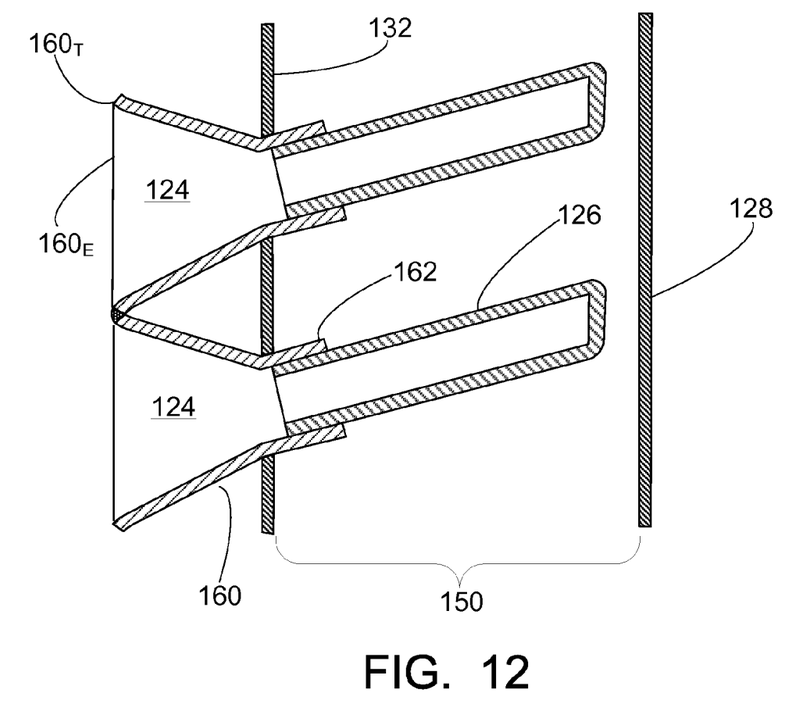
FIG. 12 shows an enlarged side sectional view of a portion of the water jacket panel of FIGS. 9 and 10 including two light aperture/light channeling tube assemblies.
Figure 13:
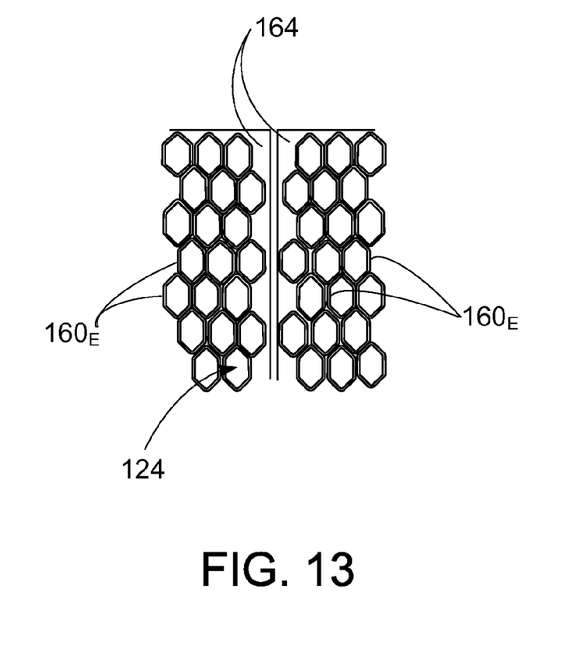
FIG. 13 shows an enlarged view of the adjoining edges of two water jacket panels of the solar receiver of FIG. 9.

With reference to FIGS. 11-12, in one suitable fabrication process each aperture 124 includes a flared light-receiving end 160 with hexagonal cross-section, and a straight end 162 also with a hexagonal cross-section. FIG. 11A shows a side view of the aperture 124 including both flared and straight sections 160, 162, while FIG. 11B shows the flared end $160_E$ of the flared light-receiving section 160. In one approach, the apertures 124 are individually stamped from sheet metal as shown in FIGS. 11A and 11B. As shown in FIG. 12, the straight end 162 of each aperture 124 is welded or brazed to the curved interior plate 132 with hexagonal holes to provide a watertight seal. The straight end 162 of the aperture 124 protrudes through the interior plate 132 and supports the hexagonal light channeling tube 126 that is force fitted into the opening of the straight end 162. In FIG. 12, the open end of the light channeling tube 126 fits inside the straight end 162. This design is advantageous because the heating of the light channeling tube 126 causes it to thermally expand more than the cooler aperture 124, making a tighter fit and reducing the possibility of loosening. In the illustrative example of FIGS. 10 and 12, the tubes 126 are not supported by or connected to the back plate 128, but rather have free ends as shown in FIGS. 10 and 12. The water jacket 130 carries the tubes 126, and expands downward much less than the back plate 128 due to the water cooling. The water jacket 130 operates at lower temperature due to the water cooling as compared to the back plate 128 which operates at about the temperature of the hot particles 56. By supporting the tubes 126 cantilevered from the first ends connected with the water jacket 130, rather than connecting their second (i.e. "back") ends to the back plate, the differential thermal expansion of the water jacket 130 versus the back plate 128 is advantageously accommodated. The ends $160_E$ of the flared light-receiving sections of adjoining apertures 124 are welded or brazed together to form a water tight seal at the exterior face of the water jacket (that is, to form the exterior light-receiving face 122). Tabs $160_T$ (shown in FIGS. 11A and 12) or other joining features may be formed on the flared ends $160_E$ of the light-receiving sections 160 to facilitate the welding and increase the size of the V-shaped flow passage on the water side for better cooling. The light-receiving face 122 further includes an exterior perimeter closure plate 164 (see FIG. 9 and enlarged view of FIG. 13) that defines the rectangular perimeter of the exterior light-receiving face 122 of each water jacket panel 130. As shown in FIG. 9, each water jacket panel 130 also has two side plates 134, a top plate 136 and a bottom plate 138 to complete the enclosure. The exterior perimeter closure plate 164 around the perimeter of the water jacket panel 130 is coated with a reflective coating (which may be the same reflective coating that is applied to the inside of the aperture 124) to reduce the potential for steaming and hot spots. The exterior sides of the top, bottom, sides and interior plate are not coated.

With reference back to FIG. 9, in a suitable mounting arrangement, each water jacket panel 130 is top supported by support rods 182 from the receiver support frame (e.g. the truss or other support structure 52 secured to the tower 18 as shown in FIG. 1) and butts against the vertical sides of adjoining water jacket panels as shown in FIG. 9 to form the cylindrical solar receiver 120. In one contemplated embodiment, the water jacket panels 130 are not welded together at neighboring exterior perimeter closure plates 164 so as not to destroy the coating, but are welded together on the interior face 132 of the water jacket at adjoining side plates 134 using a seal strip 170. In one approach the seal strip 170 is shop welded to one panel and field welded to the adjoining panel during field assembly, thus preventing solid particles from leaking out of the receiver 120 at gaps between neighboring water jacket panels 130. Advantageously, the water jacket panels 130 can be full height without the risk of thermal distortion and bowing because they are designed to operate at low and uniform temperatures (due to the water cooling). Lower surface temperatures also reduce thermal losses and increase efficiency of the solar receiver 120.

As in the illustrative embodiments of FIGS. 1-8, the hexagonal tubes 126 are arranged in a cylindrical array of radially oriented hexagonal tubes 126 where concentrated solar energy enters the flared ends $160_E$ and is reflected to the inside of each light channeling tube 126. Cold solid particles 56 enter the top of the solar receiver 120 and flow downward through the particle annulus 150 (i.e. the annular gap 150 through which the heat transfer particles 56 or other heat transfer medium flow) over the hexagonal tubes 126 to absorb the solar energy and exit the bottom of the solar receiver 120 as hot particles to be subsequently stored and used as a heat source for the power generation cycle, e.g. as already described with reference to FIG. 1.

With reference back to FIGS. 9 and 10, the outer wall of the particle annulus 150 is suitably formed by the interior face 132 of the water jacket panel 130 as shown in FIG. 10. Suitable embodiments of the inner wall (i.e. back plate 128) of the particle annulus 150 are as described in the embodiments of FIGS. 1-8, and the inner wall 128 is basically a large hollow cylinder that in one embodiment is also top supported by top support rods 180 and in one suitable approach can be fabricated from rolled plate with a longitudinal seam weld. In some embodiments the inner wall 128 of the particle annulus 150 is a separate piece, not connected to the water jacket or hex tubes, because it operates at significantly higher temperatures (roughly equal to the particle temperatures) and therefore expands downward more than the water jacket 130. In this approach the water jackets 130 are suspended separately by top support rods 182. Both the water jacket 130 and the inner diameter (ID) of the particle annulus 150 (that is, the separately suspended back plate 128) may be laterally braced to the support structure 52 at the bottom to resist wind and seismic loads, for example using a bumper system 190 shown in FIG. 10 that allows guided but free independent downward thermal expansion of the water jacket 130 and inner wall 128.

The water jacket 130 of the embodiments of FIGS. 9-13 offers diverse advantages and benefits, including (but not limited to): operating metal temperatures of the apertures 124 are significantly reduced thereby reducing risk and increasing reliability; use of conventional, proven, off-the-shelf reflective coatings inside the apertures 124 which reduces development and material costs and reduces risk on performance and durability; elimination of particle seal between modules on the exterior face; reduced solar receiver thermal losses because the outer diameter (OD) of receiver operates at significantly lower surface temperatures resulting in higher receiver efficiency which allows a smaller, lower cost heliostat field; heat absorbed by water can be used in power generation cycle to increase plant efficiency; lower aperture metal operating temperatures facilitate use of low alloy or carbon steel material resulting in increased manufacturability and reduced cost; and lower aperture temperatures may facilitate the use of brazed joints which can significantly reduce fabrication costs compared to welding.

While the illustrative examples employ water as the jacket coolant fluid, it is contemplated to employ other coolant fluids (other than the heat transfer medium) such as two-phase water-steam mixtures, forced air flow, or so forth.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

I claim:

1. A module for a solar receiver comprising:
a water jacket panel having a light receiving side and a back side and a watertight sealed plenum defined between the light-receiving side and the back side;
a plurality of light apertures extending from the light receiving side to the back side and passing through the watertight sealed plenum of the water jacket panel to receive light from the light-receiving side of the water jacket panel, wherein each light aperture includes a light-receiving end and a straight end, the light-receiving end located on the light-receiving side and the straight end protruding through the back side of the water jacket panel; and
a plurality of light channeling tubes, each light channeling tube being optically coupled to one of the light apertures and extending away from the back side of the water jacket panel.

2. The module of claim 1 wherein the light-receiving ends of the light apertures at the light receiving side of the water jacket panel are welded together to define at least a portion of the light-receiving side of the water jacket panel.

3. The module of claim 1 wherein:
the light receiving ends of the light apertures at the light receiving side of the water jacket panel form watertight seals with the light-receiving side of the water jacket panel; and
the straight ends of the light apertures at the back side of the water jacket panel form watertight seals with the back side of the water jacket panel.

4. The module of claim 1 wherein the water jacket panel further includes side plates, a top plate, and a bottom plate that connect outer perimeters of the light receiving side of the water jacket panel and the back side of the water jacket panel to seal the watertight sealed plenum.

5. The module of claim 4 wherein:
the water jacket panel includes water inlets disposed at the bottom plate of the water jacket panel and water outlets disposed at the top plate of the water jacket panel.

6. A solar receiver comprising:
a plurality of modules, each module comprising:
a water jacket panel having a light receiving side and a back side and a watertight sealed plenum defined between the light-receiving side and the back side;
light apertures passing through the watertight sealed plenum of the water jacket panel to receive light from the light-receiving side of the water jacket panel; and
light channeling tubes optically coupled with the light apertures and extending away from the back side of the water jacket panel;
wherein the plurality of modules are arranged as a cylindrical assembly of modules with the light-receiving sides of their water jacket panels facing outward; and
a cylindrical back plate disposed inside the cylindrical assembly of modules wherein a heat transfer medium gap is defined between the back sides of the water jacket panels and the cylindrical back plate.

7. The solar receiver of claim 6 further comprising:
top support rods from which the modules are suspended;
top support rods from which the cylindrical back plate is suspended; and
lateral bumpers spacing apart the back sides of the water jacket panels and the cylindrical back plate to maintain the heat transfer medium gap.

8. The solar receiver of claim 6 further comprising:
seal strips welded between adjacent water jacket panels.

9. A solar receiver comprising:
a cylindrical assembly of panels wherein each panel includes light apertures and a watertight plenum arranged to cool the light apertures, the light apertures of each panel arranged to receive light from a light-receiving face of the panel, the light-receiving faces of panels facing outward from the cylindrical assembly of panels;

a cylindrical back plate disposed inside the cylindrical assembly of panels with an annular gap defined between the cylindrical assembly of panels and the cylindrical back plate; and light channeling tubes having open first ends connected to the light apertures of the cylindrical assembly of panels and extending into the annular gap defined between the cylindrical assembly of panels and the cylindrical back plate and having closed second ends opposite the open first ends;

wherein each panel of the cylindrical assembly of panels further includes back, side, top, and bottom plates whose perimeters are connected to define the watertight plenum.

10. The solar receiver of claim 9 wherein the light apertures of each panel are welded together to form at least a portion of the light-receiving face of the panel.

11. The solar receiver of claim 9 wherein the closed second ends of the light channeling tubes are not connected to the cylindrical back plate.

12. A solar receiver comprising:

a cylindrical assembly of panels wherein each panel includes light apertures and a watertight plenum arranged to cool the light apertures, the light apertures of each panel arranged to receive light from a light-receiving face of the panel, the light-receiving faces of panels facing outward from the cylindrical assembly of panels;

a cylindrical back plate disposed inside the cylindrical assembly of panels with an annular gap defined between the cylindrical assembly of panels and the cylindrical back plate; and light channeling tubes having open first ends connected to the light apertures of the cylindrical assembly of panels and extending into the annular gap defined between the cylindrical assembly of panels and the cylindrical back plate and having closed second ends opposite the open first ends;

wherein the closed second ends of the light channeling tubes are not connected to the cylindrical back plate; and wherein the cylindrical assembly of panels and the cylindrical back plate are separately supported.

13. The solar receiver of claim 12 further comprising:

bumpers disposed between the cylindrical assembly of panels and the cylindrical back plate to maintain the annular gap defined between the cylindrical assembly of panels and the cylindrical back plate.

14. The solar receiver of claim 9 wherein neighboring panels of the cylindrical assembly of panels are welded together at their adjoining edges.

15. The module of claim 1, wherein the light channeling tubes have a hexagonal cross-section.

* * * * *